United States Patent
Troster

(10) Patent No.: US 6,825,842 B1
(45) Date of Patent: Nov. 30, 2004

(54) METHOD AND SYSTEM FOR QUEUEING DRAW OPERATIONS

(75) Inventor: Joel Troster, Thornhill (CA)

(73) Assignee: ATI International, SRL, Hastings Christ Church (BB)

( * ) Notice: Subject to any disclaimer, the term of this patent is extended or adjusted under 35 U.S.C. 154(b) by 0 days.

(21) Appl. No.: 09/408,991

(22) Filed: Sep. 29, 1999

(51) Int. Cl.[7] .............................................. G06T 15/00
(52) U.S. Cl. ...................................................... 345/522
(58) Field of Search ................................ 345/553, 522, 345/558, 505, 543, 423, 503, 419, 536, 501, 539; 370/229; 710/23, 22; 711/158; 712/220; 709/232; 707/102

(56) References Cited

U.S. PATENT DOCUMENTS 6,339,427 B1 * 1/2002 Laksono et al. ............ 345/553

\* cited by examiner

Primary Examiner—Matthew C. Bella
Assistant Examiner—Daup K. Singh
(74) Attorney, Agent, or Firm—Vedder, Price, Kaufman & Kammholz

(57) ABSTRACT

In accordance with one embodiment of the present invention, the client maintains a count of the number of commands issued to a circular buffer associated with the drawing engine. For every predetermined number of commands issued, a store command is issued that includes the current count. The current count when executed is stored in a location generally associated with the graphics engine. The client periodically reads the current count from the storage location and compares this value to its current count. The result of this comparison provides an estimated value of the number of commands which have not been executed by the graphics engine. When the estimated value exceeds a predetermined value the client will delay issuing further commands, until subsequent current count values stored in the location indicate that the number of commands stored in the command buffer has fallen below a predetermined value.

20 Claims, 6 Drawing Sheets

METHOD AND SYSTEM FOR QUEUEING DRAW OPERATIONS

FIELD OF THE INVENTION

The present invention relates generally to a graphics system, and more specifically to a system for issuing and retrieving drawing commands.

BACKGROUND OF THE INVENTION

Modern computer systems consist of application programs which provide video commands and associated data to a video subsystem in order provide a desired image upon a display. Because video commands take a varied amount of time for a video engine to process, some kind of buffering is desirable between the application program and the video engine. As a result, most video subsystems provide some kind of acceptable buffering of video commands and their data. A common type of buffer is a circular command buffer, which receives drawing requests from a client, and stores as many of requests as possible until the buffer is full.

By using a circular buffer, a client, such as a application driver, can provide many commands to the command buffer when it has access to the appropriate bus resources. Because drawing commands can be quite large, buffers are often used that are capable of supporting both a large number of commands, and commands having a large size due to the associated data. Such buffers allow the graphics engine to receive commands from the command buffer even when other system clients need bus resources.

A disadvantage with the large circular buffer is that the display engine can take a significant amount of time, a minute or more, to execute all of the pending video commands when the number of commands is large. During this time the system appears unresponsive. As a result, when a user attempts to perform another function, such as close a window, the function will be delayed by that latency until all of the video commands are issued. The resulting delay viewed by the user gives the perception that the system is slow, when in actuality it is a result of the architecture of the video subsystem that cause the delay.

Therefore, a better system and method capable of governing the number of issued commands such that the response viewed by the user is improved would be desirable.

DETAILED DESCRIPTION OF THE DRAWINGS

Figure 1:
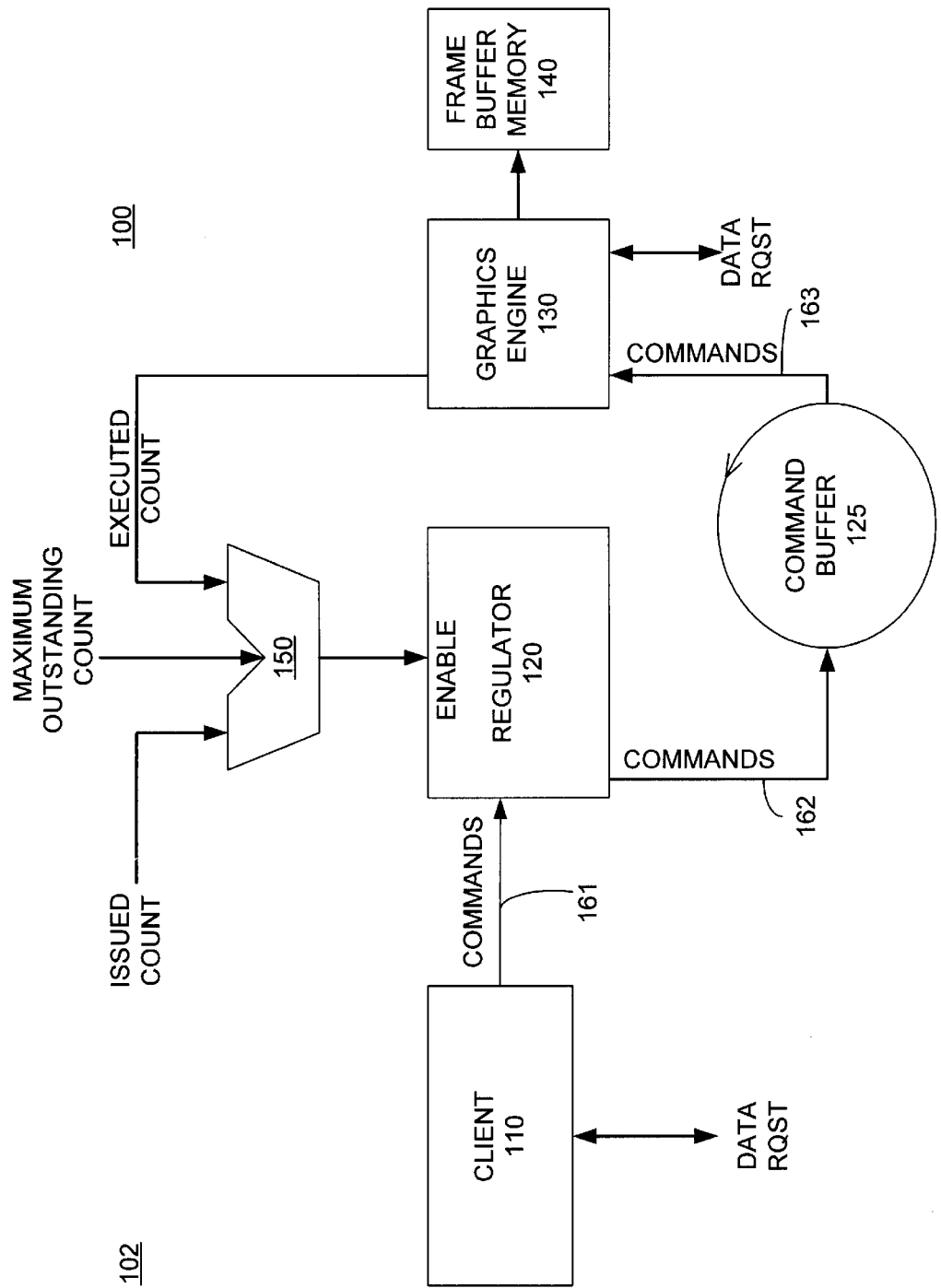
FIG. 1 illustrates, in block diagram form, a system 100 in accordance with the present invention.

In accordance with one embodiment of the present invention, the client maintains a count of the number of commands issued to a circular buffer associated with the drawing engine. For every predetermined number of commands issued, a store command is issued that includes the current count. The current count when executed is stored in a location generally associated with the graphics engine. The client periodically reads the current count from the storage location and compares this value to its current count. The result of this comparison provides an estimated value of the number of commands which have not been executed by the graphics engine. When the estimated value exceeds a predetermined value a regulation function will delay issuing further commands, until subsequent current count values stored in the location indicate that the number of commands stored in the command buffer has fallen below a predetermined value.

The present invention is best understood with reference to the drawings. FIG. 1 illustrates a block diagram of a system portion 100. System portion 100 includes a client 110, a regulator 120, a buffer 125, a graphics engine 130, a frame buffer memory 140, and a arithmetic compare portion 150.

In a specific embodiment, the client 110 is an application that generates drawing commands to be displayed on a display device (not shown). The drawing commands are provided to the regulator 120. The regulator will provide the commands to the command buffer 125, unless it is determined too many commands already reside in the command buffer 125. Whether too many commands are in the command buffer is indicated to the regulator 120 by a control signal from an arithmetic comparator 150. Command buffer 125 stores the commands which are ultimately to be executed by the graphics engine 130. The graphics engine 130, which is a command execution device, upon receiving a command will execute the command and renders the drawing information to frame buffer memory 140. Note that the regulator 120 and the comparator 150 can be hardware or software implemented functions.

The graphics engine 130 maintains a count indicating how many commands have been executed. This executed count, which may be an estimate, is provided to the arithmetic comparator 150. Likewise, the client 110 maintains a count indicating how many commands have been issued. This issued count, which may be an estimate, is also provided to the comparator 150. By subtracting the executed count from the issued count, it is possible to determine the number of commands which remain in the command buffer 125. When the result is less than a maximum allowed outstanding count, the number of commands that can be stored is greater than the number of commands actually stored, therefore, an asserted enable signal is provided to the regulator 120, and additional commands can be stored within the command buffer 125 without effecting the response time of the computer, as perceived by the user. Conversely, when the result is greater than a maximum allowed outstanding count, the number of commands that are stored is greater than the number of commands desired to be stored, therefore, the enable signal is negated to the regulator 120, and additional commands can not be stored within the command buffer 125.

Note that there is also a buffer full regulator (not illustrated) that prevents commands from issuing that will cause the buffer to overflow. Generally, the buffer full regulator does not have the opportunity to limit commands where the commands are generally small.

Figure 2:
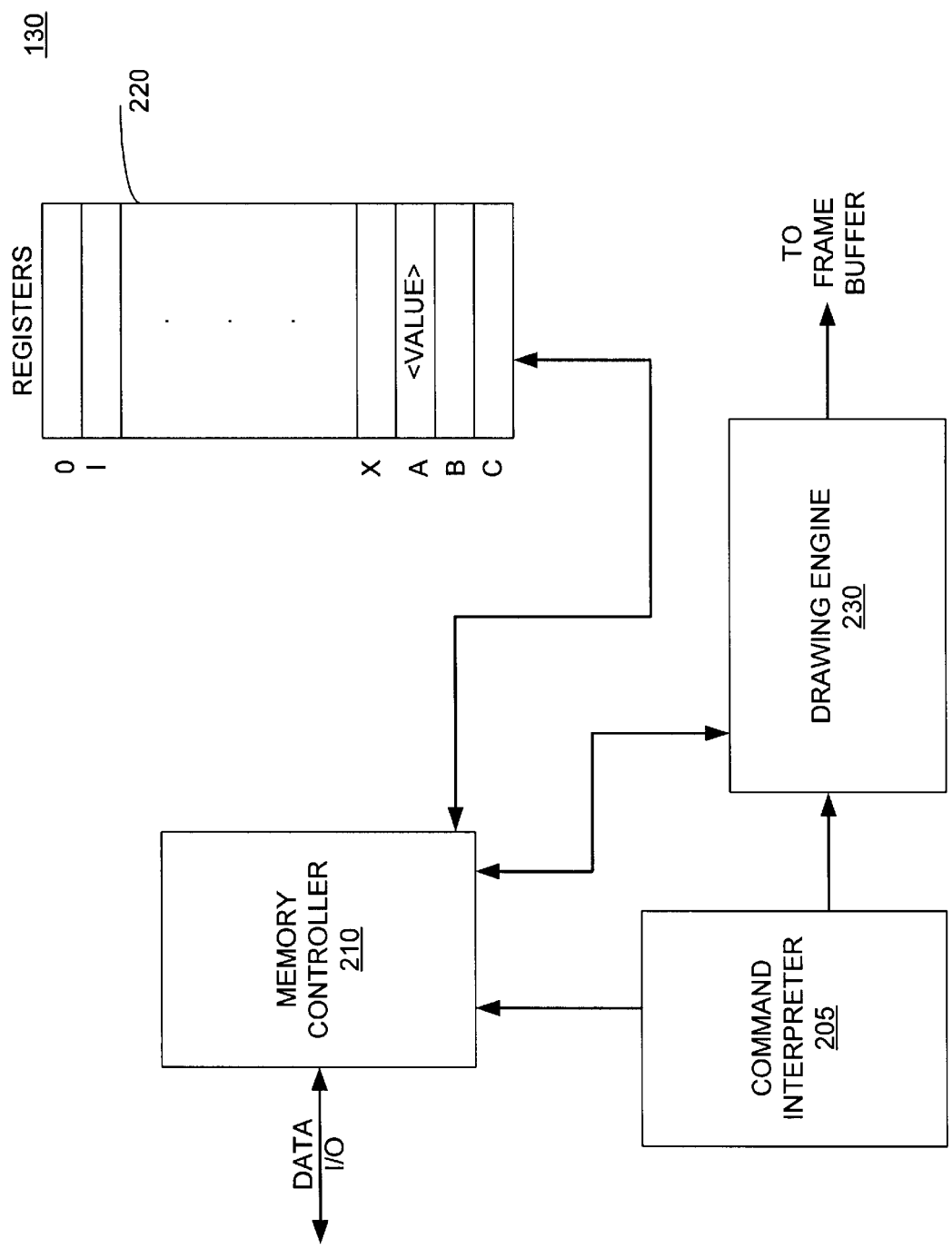
FIG. 2 illustrates, in block diagram form, a detailed view of a portion of the system of FIG. 1.

FIG. 2 illustrates a specific implementation of the graphics engine 130 capable of implementing the present invention. FIG. 2 illustrates a command interpreter which receives the commands from the buffer 125, and in response will access one of a plurality of graphics engine resources. One graphics engine resource is the memory controller 210, a second graphics engine resource is the drawing engine 230. The drawing engine 230 is utilized to render drawing commands for display. The memory controller 210 is utilized to access the register space 220, or other memory space, illustrated in FIG. 2.

In operation, the client 110 of FIG. 1 issues a predetermined number of commands followed by a store command.

In a specific embodiment, these commands are allowed to issue to the command buffer by the regulator 120. For example, as permitted by the regulator 120, the client 110 will issue a predetermined number of commands. Generally, the predetermined number of commands will be in the range of 50 to 2000 commands. For example, where 256 drawing commands for providing or manipulating specific images to be provided to the frame buffer memory 140. In addition to the drawing commands, the client 110 will issue a store command which includes the current number of commands issued by the client 110 up until that point.

When the store command is received and executed by the command interpreter 205, the value associated with the store command represents the number of commands which have been executed upon the graphics engine. For example, assuming a system reset, whereby the storage location is set equal to zero, the client 110 would issue 256 commands, followed by a store command with the value 256. The graphics engine retrieves the first 256 draw commands and executes them rendering data to the memory buffer 140 as appropriate. Subsequent to the execution of these 256 commands the $257^{th}$ command received by the graphics engine will be a store command indicating to the command interpreter to store the value 256 in a specific location, for example one of the register locations 220.

Referring to the register 220 of FIG. 2, registers 0 through X indicate reserved registers which configure, or are used for the actual operation of the graphics engine 130. Registers A–C indicate extra, or scratch registers available to a user. By issuing a store command that stores a issued count value (i.e. 256) in register A, the value stored in register A will contain a the most recently stored number of executed interactions. This value will generally be an approximation, as it is updated only once every 256 commands.

To determine whether additional commands should be submitted to the graphics engine 130, the client 110 can periodically request the value stored in register A to be provided to the client, this is accomplished through the data request from client 110 to graphics engine 130. The memory controller 210 data I/O port of FIG. 2 receives and services the data request. By comparing the value stored in the graphics engine 130 to the number of commands actually issued, an estimation as to the number of commands remaining on the buffer 125 can be made. Based upon this value the enable input of the regulator 120 will receive an asserted signal allowing additional commands can be issued, or receive a deasserted signal preventing additional commands from being asserted.

Figure 3:
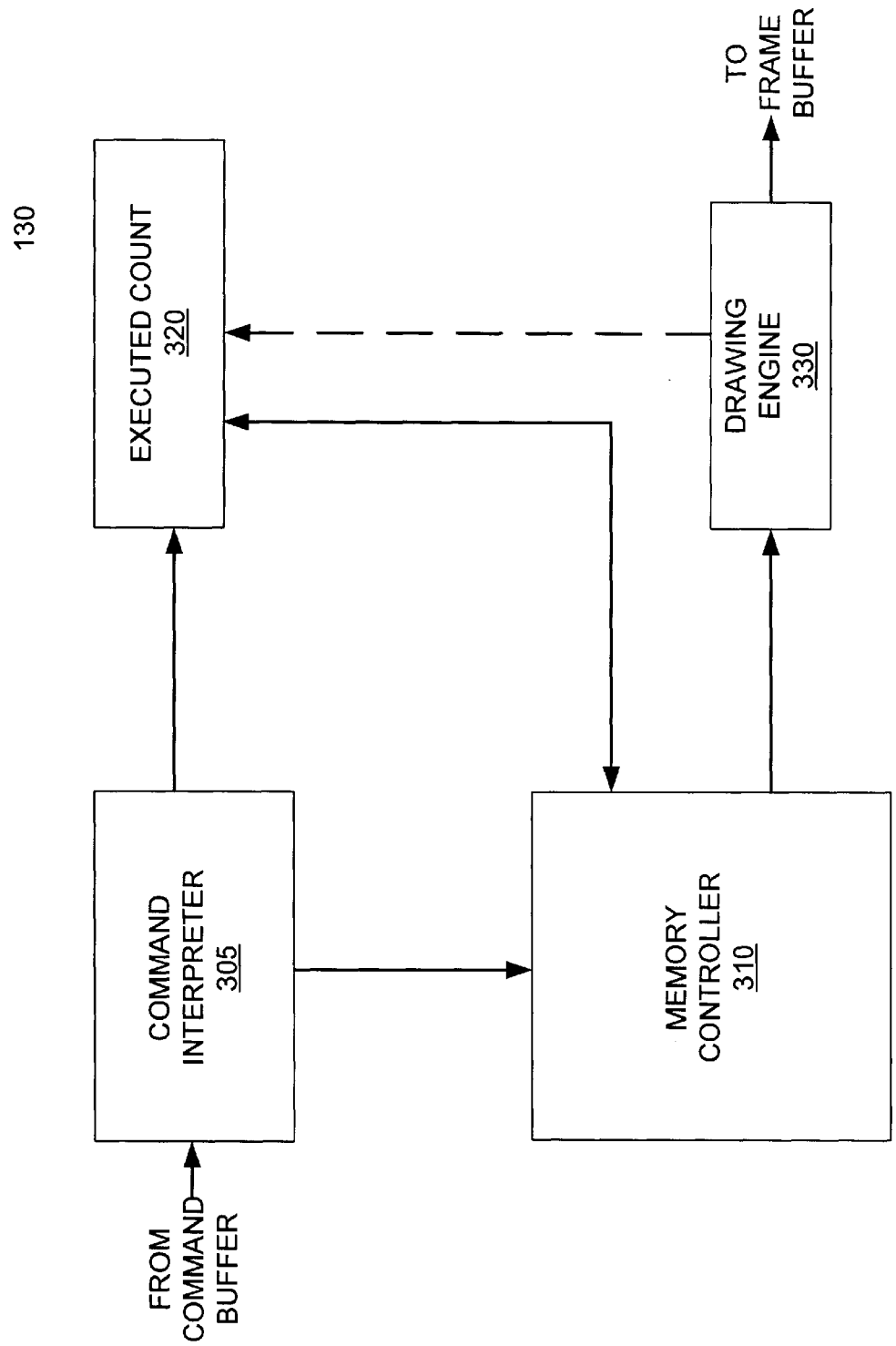
FIG. 3 illustrates, in block diagram form, a detailed view of a portion of the system of FIG. 1.

FIG. 3 illustrates an alternate embodiment of the graphics engine 130. The graphics engine 130 of FIG. 3 maintains a count of its own executed commands. This can be accomplished by incrementing a counter each time a command is retrieved or completed. In this manner, the client will not need to provide a store command indicating the issue count that is stored in the graphics engine. This is advantageous in that it provides for a more accurate instruction count, however, a disadvantage of this implementation is that modifications to the graphics engine must be made to support monitoring the count.

The embodiments described in FIGS. 1–3 provide advantages over the prior art, in that the system limits the number of commands stored on the command buffer 125. Therefore, the command buffer 125 can be large to support large commands, while not running the risk of storing an unreasonable number of small efficient commands.

Figure 4:
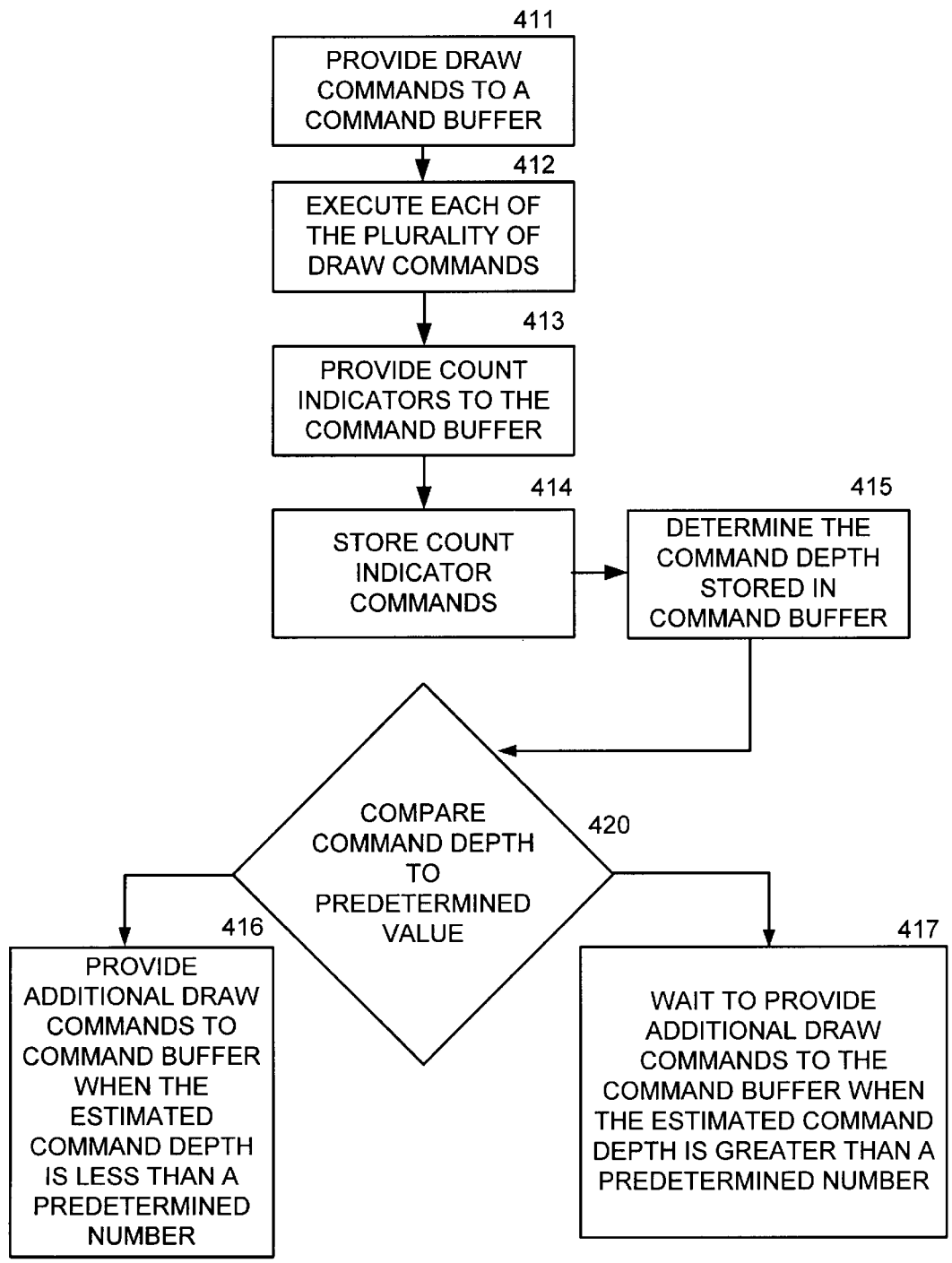
FIGS. 4 and 5 illustrate, in flow diagram form, methods in accordance with the present invention.

FIG. 4 illustrates a method in accordance with the present invention. At step 411, new drawing commands are provided to the command buffer. Referring to FIG. 1, this corresponds to the client 110 providing a plurality of commands to graphics engine 130 when the regulator 120 is enabled.

At step 412, each of the plurality of drawing commands is executed. The actual execution of the drawing command occurs via the graphics engine 130 upon receipt from the command buffer 125.

At step 413 a count indicator is provided to the command buffer. As discussed with reference to FIG. 2, such a count indicator can be provided to the command buffer as part of a store command. The store command is used to identify registers, associated with the graphics engine 130, in which to store the count. In an alternative embodiment, the value could be written to a non-register type storage location which is capable of being accessed by the graphics engine 130 and stored thereby. The step 413 can occur prior to step 412.

At step 414, the count indicator is stored. As discussed with reference to FIG. 2, the count indicator value is stored in the register set 220 associated with the graphics engine 130.

At step 415, a determination is made as to a command depth stored in the command buffer based upon a plurality of count indicators. As previously discussed, this can be an exact count, whereby the drawing engine provides the number of executed commands to be compared with the issued commands, or it can be an estimated count, whereby a client requests the value stored with reference to FIG. 2 for comparison to the number of issued commands. At step 420, the command depth is compared to a predetermined value. If the command depth exceeds a predetermined value the flow proceeds to step 417 whereby additional draw commands are not issued. However, if the command depth does not exceed a predetermined value, the flow will proceed to step 416 where additional drawing commands are provided to the command buffer. The flow from step 417 returns to step 415 where the command depth is recalculated. From 416, the flow returns to step 411.

Figure 5:
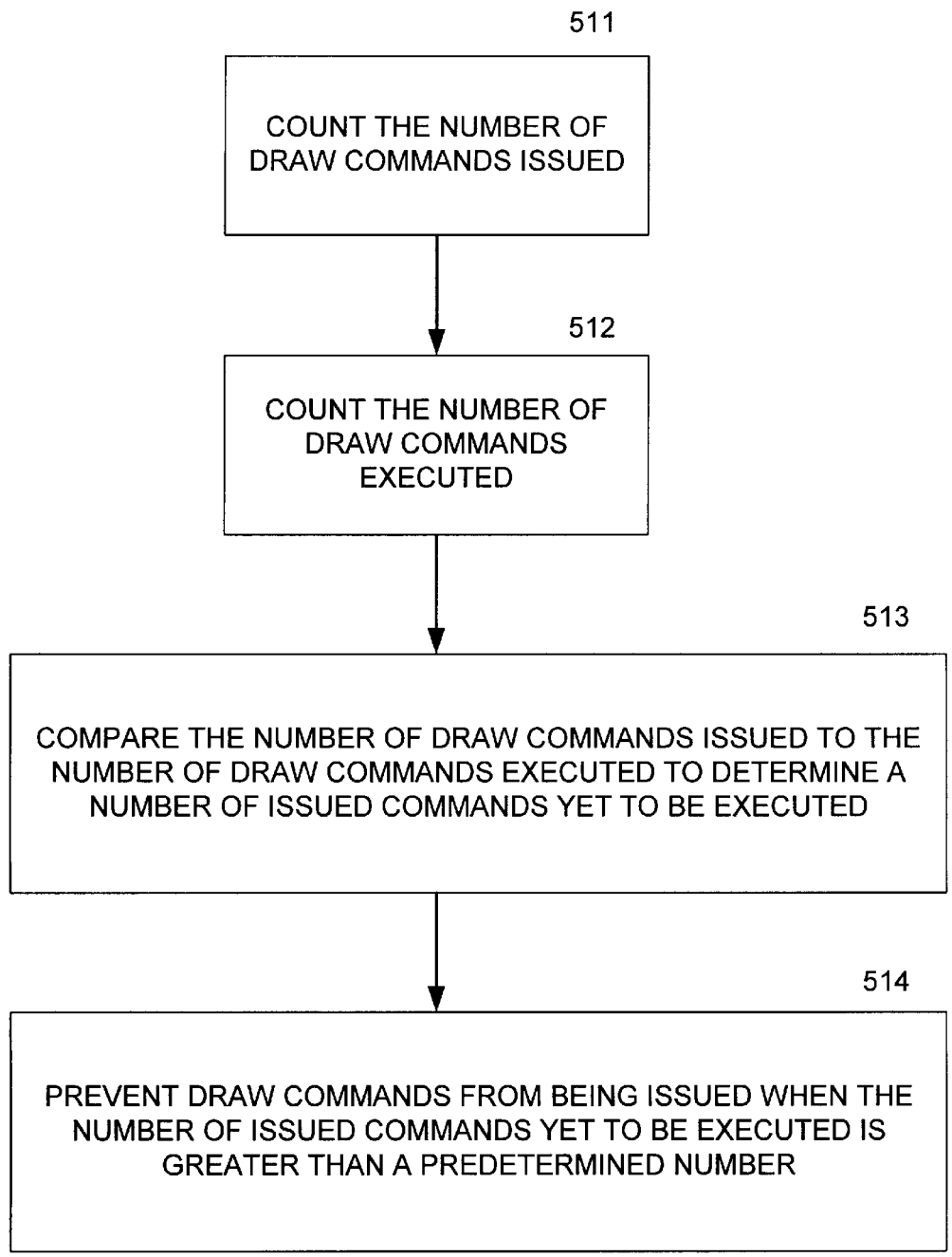

FIG. 5 illustrates an alternate method in accordance with the present invention. At step 511, the number of draw commands issued is counted. Generally, this is accomplished by the client issuing the commands. At step 512, the number of draw commands executed is counted. In a specific embodiment, this would be accomplished by the execution device which retrieves and executes the commands. At step 513, the number of draw commands issued is compared to the number of draw commands executed to determine a number of issued commands yet to be executed. At step 514, draw commands are prevented from being issued when the number of issued commands yet to be executed is greater than a predetermined number.

The present invention provides advantages over the prior art, in that it is possible to determine and/or estimate the number of commands remaining in a command buffer, thereby being able to determine whether or not it is appropriate to issue additional commands, or to delay the issuance of commands. Such an implementation can be used to improve a user interface delay in systems having large command buffers.

It should be understood that the specific steps indicated in the methods herein may be implemented in hardware and/or software. For example, a specific step may be performed using software and/or firmware executed on one or more processing modules. In general, a system for providing images may include a more generic processing module and memory. The processing module can be a single processing device or a plurality of processing devices. Such a processing device may be a microprocessor, microcontroller, digital processor, micro computer, a portion of the central processing unit, a state machine, logic circuitry, and/or any device that manipulates the signal. The manipulation of these signals is generally based upon operational instructions. The memory may be a single memory device or a plurality of memory devices. Such a memory device may be a read only memory, a random access memory, a floppy disk memory, magnetic tape memory, erasable memory, a portion of a system memory, and/or any device that stores operational instructions in a digital format. Note that when the processing module implements one or more of its functions to be a state machine or logic circuitry, the memory storing in the corresponding operational instructions is embedded within the circuitry comprising the state machine and/or other logic circuitry.

Figure 6:
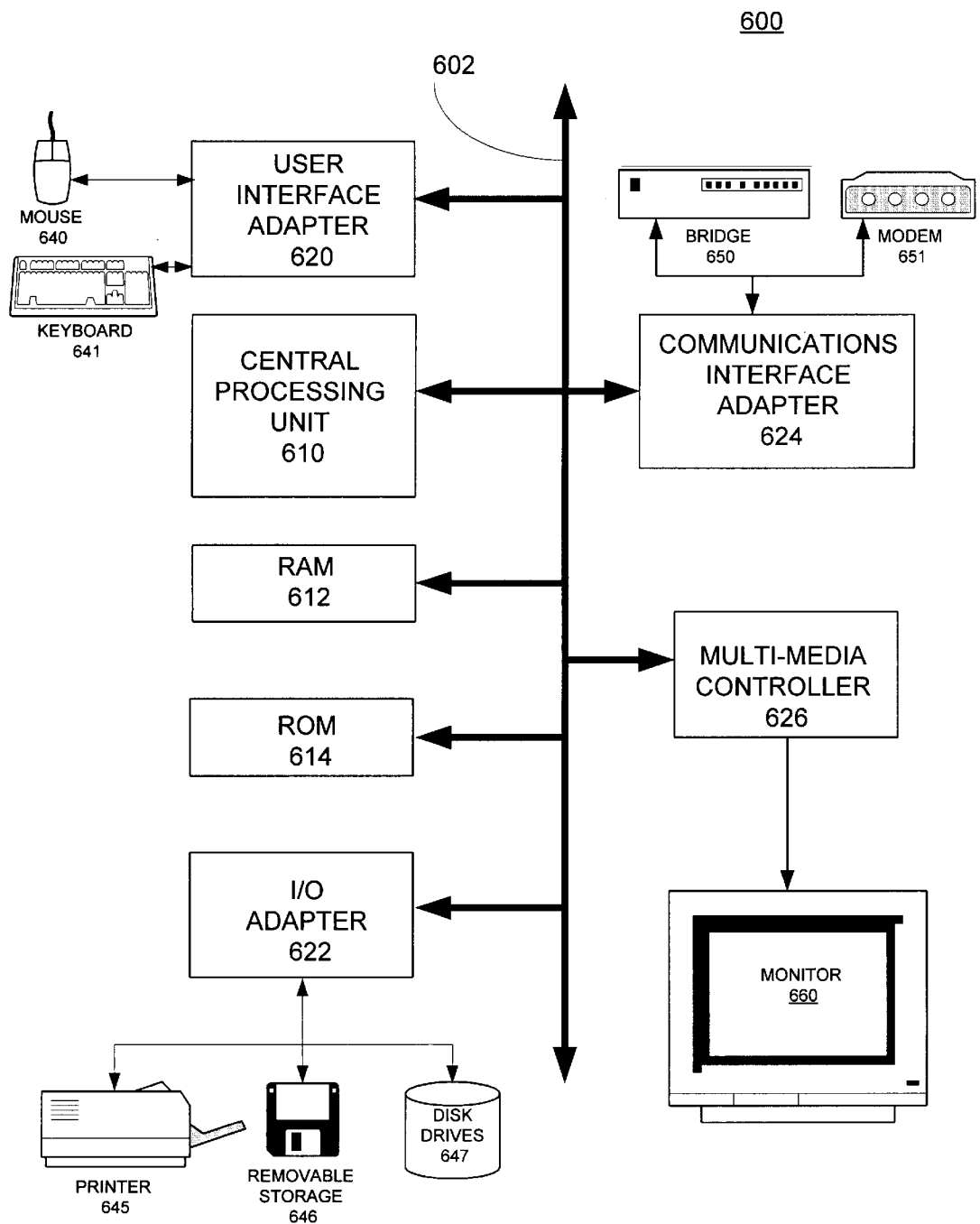
FIG. 6 illustrates, in block diagram form, a general purpose computer device in accordance with the present invention.

FIG. 6 illustrates, in block diagram form, a processing device in the form of a personal computer system 600. The computer system 600 is illustrated to include a central processing unit 610, which may be a conventional proprietary data processor, memory including random access memory 612, read only memory 614, and input output adapter 622, a user interface adapter 620, a communications interface adapter 624, and a multimedia controller 626.

The input output (I/O) adapter 622 is further connected to, and controls, disk drives 647, printer 645, removable storage devices 646, as well as other standard and proprietary I/O devices.

The user interface adapter 620 can be considered to be a specialized I/O adapter. The adapter 620 is illustrated to be connected to a mouse 640, and a keyboard 641. In addition, the user interface adapter 620 may be connected to other devices capable of providing various types of user control, such as touch screen devices.

The communications interface adapter 624 is connected to a bridge 650 such as is associated with a local or a wide area network, and a modem 651. By connecting the system bus 602 to various communication devices, external access to information can be obtained.

The multimedia controller 626 will generally include a video graphics controller capable of displaying images upon the monitor 660, as well as providing audio to external components (not illustrated).

Generally, the system 600 will be capable of implementing the system and methods described herein.

The present invention provides advantages over the prior art. In addition to the embodiment illustrated herein, one skilled in the art will recognize that many variations to the present invention can be implemented. For example, the client 110, regulator 120, and arithmetic function 150 can all be associated with a software driver executed on a central CPU. In an alternate embodiment, the compare function can be integrated into the graphics engine 130 along with a register capable of storing the number of issued commands, thereby allowing the graphics engine 130 to perform the arithmetic function 150. In other embodiments, the actual values stored could be stored in generic memory, as opposed to register locations.

I claim:

1. A method for queuing draw operations, the method comprising:
   providing a plurality of draw commands to a command buffer;
   providing a plurality of count indicators from a client to the command buffer;
   determining a command depth based upon the plurality of count indicators;
   waiting to provide additional draw commands to the command buffer when the command depth is greater than a predetermined number.

2. The method of claim 1, wherein the step of providing a plurality of count indicators includes providing one of the plurality of count indicators for each of a predetermined number of draw commands provided during the step of providing a plurality of draw commands.

3. The method of claim 2, wherein the predetermined number is in the range of 50 to 2000.

4. The method of claim 3, wherein the predetermined number is 256.

5. The method of claim 1, wherein the step of providing a plurality of count indicators further comprises providing a plurality of store commands.

6. The method of claim 5, further comprising the step of:
   executing each of the plurality of draw commands and store commands on a graphics engine.

7. The method of claim 5, wherein each one of the plurality of count indicators is stored in a storage location associated with the graphics engine.

8. The method of claim 7, wherein the storage location is a register.

9. The method of claim 8, wherein the step of determining a command depth includes determining an estimated command depth.

10. The method of claim 9, wherein the step of waiting includes the estimated command depth having a value based upon a next count indicator less a value stored at the storage location.

11. A method of providing draw commands to a graphics engine, the method comprising:
    counting the number of draw commands issued;
    counting the number of draw commands executed;
    comparing the number of draw commands issued to the number of draw commands executed to determine a number of issued commands yet to be executed; and
    preventing draw commands from being issued when the number of issued commands yet to be executed is greater than a predetermined number.

12. The method of claim 11, wherein the step of counting the number of draw commands executed is performed by a command execution device.

13. The method of claim 11, wherein the step of counting the number of draw commands executed is based upon a value stored in a command execution device in response to a store command issued by an issuing device.

14. A system for queuing draw operations, the system comprises:
    a processing module; and
    memory operably coupled to the processing module, wherein the memory stores operational instructions that cause the processing module to:
      provide a plurality of draw commands to a command buffer;
      provide a plurality of count indicators from a client to the command buffer;
      determine a command depth based upon the plurality of count indicators; and
      wait to provide additional draw commands to the command buffer when the estimated command depth is greater than a predetermined number.

15. A computer readable medium (storage medium) storing a routine for providing draw commands comprising the steps of:
    providing a plurality of draw commands to a command buffer;
    providing a plurality of count indicators from a client to the command buffer;
    determining a command depth based upon the plurality of count indicators; and waiting to provide additional draw commands to the command buffer when the estimated command depth is greater than a predetermined number.

16. A system comprising:

a client to provide drawing commands;

a regulator to receive the drawing commands and having an output to issue the drawing commands;

a queue having an input coupled to the output of the regulator, and an output;

a queue server having an input coupled to the output of the queue.

17. The system of claim 16, wherein the client is video driver software.

18. The system of claim 16, wherein the regulator is implemented in software.

19. The system of claim 16, wherein the queue is a circular buffer.

20. The system of claim 16, wherein the queue server is a video engine.

* * * * *